(12) United States Patent
Klinetob et al.

(10) Patent No.: US 8,573,947 B2
(45) Date of Patent: Nov. 5, 2013

(54) COMPOSITE FAN BLADE DOVETAIL ROOT

(75) Inventors: Carl Brian Klinetob, East Haddam, CT (US); Brian P. Huth, Westfield, MA (US); Gregory E. Reinhardt, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 910 days.

(21) Appl. No.: 12/721,101

(22) Filed: Mar. 10, 2010

(65) Prior Publication Data

US 2011/0223027 A1   Sep. 15, 2011

(51) Int. Cl.
*F01D 5/30* (2006.01)
(52) U.S. Cl.
USPC .................. 416/230; 416/248; 416/229 A
(58) Field of Classification Search
USPC ...................................... 416/230, 229 A, 248
See application file for complete search history.

(56) References Cited

U.S. PATENT DOCUMENTS

| | | | |
|---|---|---|---|
| 2,868,441 A * | 1/1959 | Reutt | 416/230 |
| 3,752,600 A * | 8/1973 | Walsh et al. | 416/219 R |
| 5,067,877 A | 11/1991 | Youssef | |
| 5,443,367 A | 8/1995 | Samit et al. | |
| 5,573,377 A | 11/1996 | Bond et al. | |
| 5,993,162 A | 11/1999 | Weisse et al. | |
| 6,290,466 B1 | 9/2001 | Ravenhall et al. | |
| 6,764,282 B2 | 7/2004 | Suciu et al. | |
| 6,832,896 B1 | 12/2004 | Goga et al. | |
| 7,300,255 B2 | 11/2007 | Potter et al. | |
| 7,384,240 B2 | 6/2008 | McMillan et al. | |
| 8,277,188 B2 * | 10/2012 | Belmonte | 416/193 R |

FOREIGN PATENT DOCUMENTS

GB           859686         1/1961

* cited by examiner

*Primary Examiner* — Ninh H Nguyen
(74) *Attorney, Agent, or Firm* — Kinney & Lange, P.A.

(57) ABSTRACT

A composite fan blade having an airfoil with a leading edge and a trailing edge and a dovetail root includes a first pressure face and second pressure face, a lower horizontal face connecting the pressure faces at the bottom of the dovetail and a first and a second dovetail runout fillet connecting the pressure faces to the airfoil. The pressure faces are each angled outward at about 65 degrees to about 75 degrees from horizontal.

17 Claims, 5 Drawing Sheets

COMPOSITE FAN BLADE DOVETAIL ROOT

BACKGROUND

Composite materials offer potential design improvements in gas turbine engines. For example, in recent years composite materials have been replacing metals in gas turbine engine fan blades because of their high strength and low weight. Most metal fan blades for a gas turbine engine are titanium. The ductility of titanium fan blades enables the fan to ingest a bird and remain operable or be safely shut down. The same requirements are present for composite fan blades.

A composite fan blade can have a sandwich construction with a three-dimensional woven core at the center and two-dimensional filament reinforced plies or laminations on either side. To form the composite blade, individual two-dimensional laminations are cut and stacked in a mold with the woven core. The woven core extends from the root to the tip of the blade and the plies are stacked on either side of the woven core to form the desired exterior surface profile. The mold is injected with a resin using a resin transfer molding process and is cured. A composite fan blade can also be made only of the two-dimensional laminate plies without the woven core.

A composite blade has a root, which connects to the fan mechanism, and a tip opposite the root. A composite blade for a turbine engine fan blade is typically designed with a divergent root portion known as a dovetail root. The thickness of the blade greatly changes over a short length at the dovetail root. The dovetail root enables the airfoil to withstand typical operational loads from rotation and bending and loads from foreign object strikes. The dovetail root typically slides into a slot in a disc or a rotor to hold the airfoil in place while the disc or rotor is spinning.

SUMMARY

A composite fan blade having an airfoil with a leading edge and a trailing edge, and a dovetail root includes a first pressure face and a second pressure face, a lower horizontal face connecting the pressure faces at the bottom of the dovetail and a first and a second dovetail runout fillet connecting the pressure faces to the airfoil. The pressure faces are each angled outward at about 65 degrees to about 75 degrees from horizontal.

DETAILED DESCRIPTION

Figure 1:
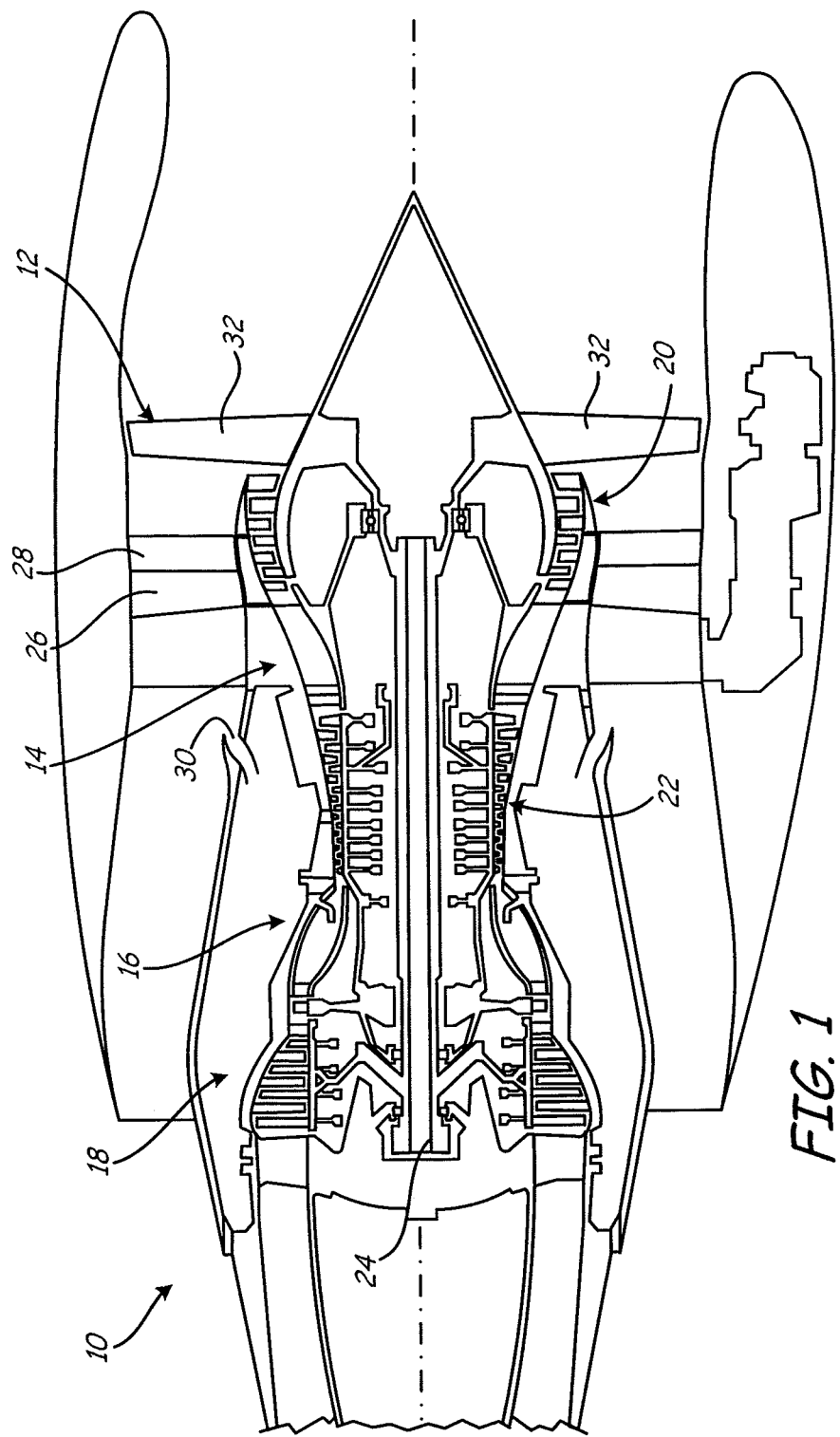
FIG. 1 is a cross-sectional view of a gas turbine engine.

FIG. 1 is a cross-sectional view of gas turbine engine 10, which includes turbofan 12, compressor section 14, combustion section 16 and turbine section 18. Compressor section 14 includes low-pressure compressor 20 and high-pressure compressor 22. Air is taken in through fan 12 as fan 12 spins. A portion of the inlet air is directed to compressor section 14 where it is compressed by a series of rotating blades and vanes. The compressed air is mixed with fuel, and then ignited in combustor section 16. The combustion exhaust is directed to turbine section 18. Blades and vanes in turbine section 18 extract kinetic energy from the exhaust to turn shaft 24 and provide power output for engine 10.

The portion of inlet air that is taken in through fan 12 and not directed through compressor section 14 is bypass air. Bypass air is directed through bypass duct 26 by guide vanes 28. Then the bypass air flows through opening 30 to cool combustor section 16, high pressure compressor 22 and turbine section 18. Fan 12 includes a plurality of composite blades 32 inserted into disc 34 (see FIG. 2).

Figure 2:
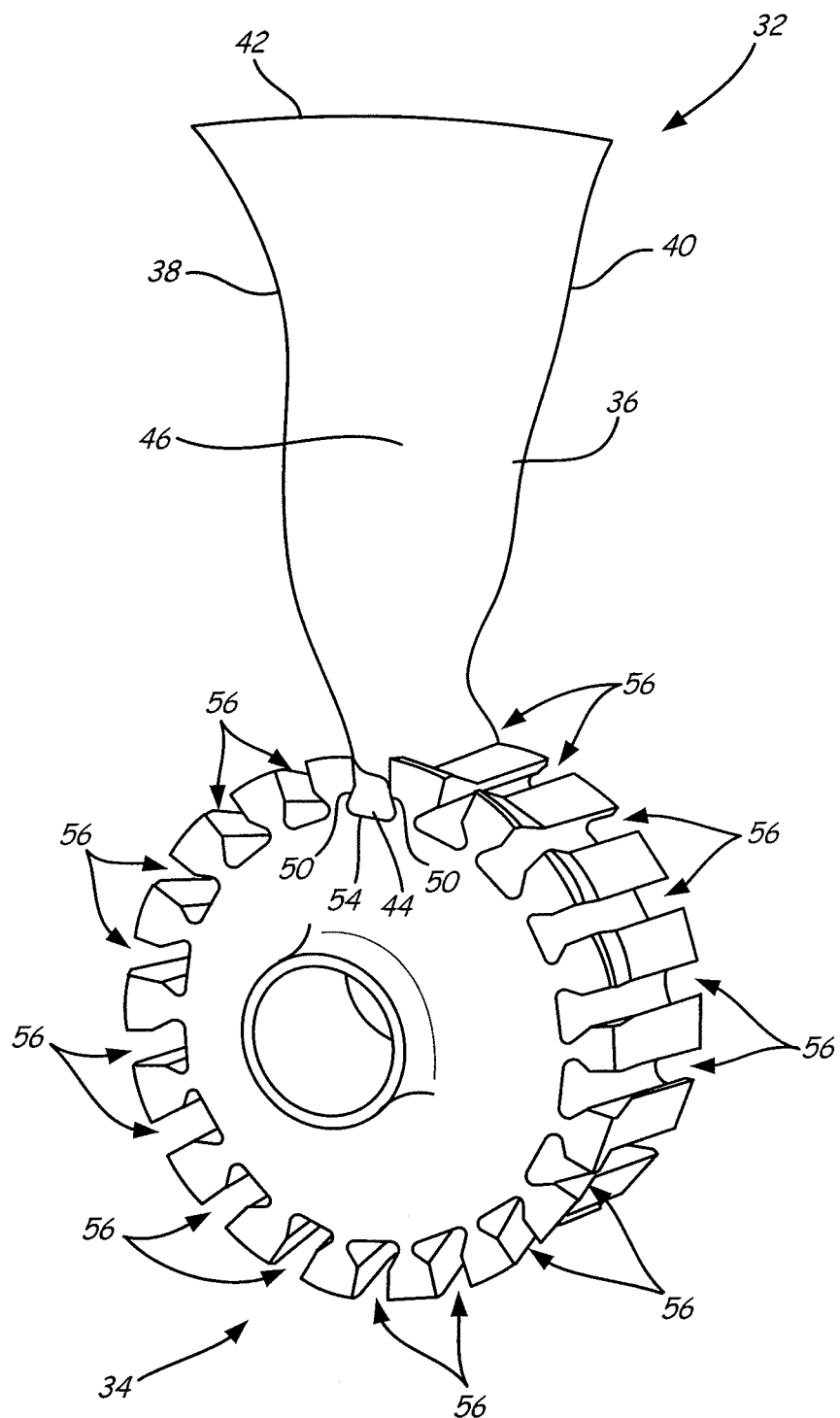
FIG. 2 is a perspective view of a composite blade inserted in a disc.

FIG. 2 illustrates one composite blade 32 inserted in disc 34. Composite blade 32 includes composite airfoil 36, leading edge 38, trailing edge, 40, tip 42, dovetail root 44, suction side 46 and pressure side 48 (shown in FIG. 3). Dovetail root 44 includes angled pressure faces 50, dovetail runout fillets 52, and lower horizontal face 54. Disc 34 includes slots 56. Dovetail root 44 is opposite tip 42, and is inserted in slot 56 in disc 34. While only one blade is illustrated, it is to be understood that in operation, a composite blade 32 would be inserted into each slot 56 in disc 34.

Dovetail root 44 of composite blade 32 and slot 56 in disc 34 are shaped so that dovetail root 44 slides into slot 56 (i.e., the shapes are complementary). When fan 12 is in operation, disc 34 spins, rotating composite blades 32 to provide air intake for engine 10 (see FIG. 1). Blade 32 is retained in disc 34 by dovetail root 44, and specifically by angled pressure faces 50 of dovetail root 44. Pressure faces 50 angle outward from composite airfoil 36 at specific angles to resist centrifugal forces and hold blade 32 in disc 34 during operation.

Figure 3:
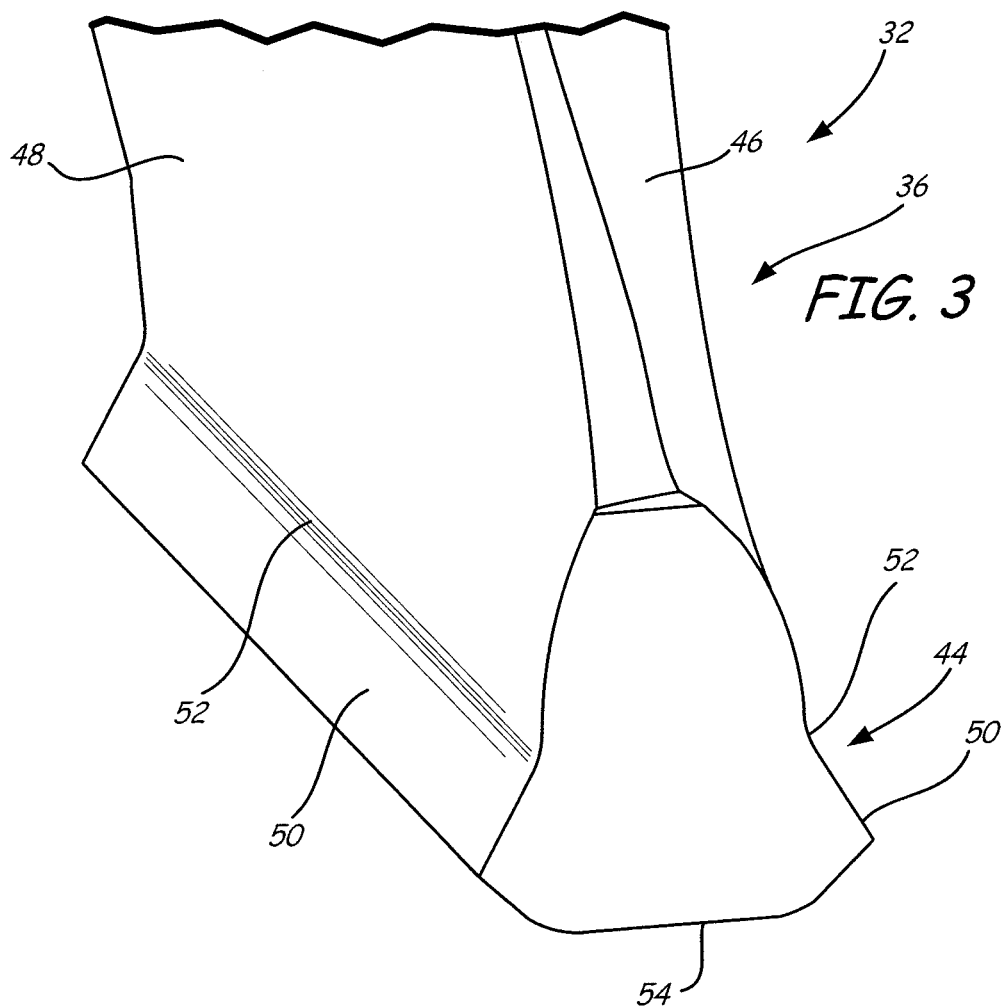
FIG. 3 is an enlarged perspective view of a dovetail root portion of the composite blade of FIG. 2.

FIG. 3 illustrates an enlarged perspective view of dovetail root 44 of composite blade 32 with suction side 46 and pressure side 48. Dovetail root 44 includes pressure faces 50, dovetail runout fillets 52, and lower horizontal face 54. Pressure faces 50, dovetail runout fillets 52 and lower horizontal face 54 extend in the chordwise direction of blade 32 from leading edge 38 to trailing edge 40.

Pressure faces 50 are connected to airfoil 36 suction side 46 and pressure side 48 by dovetail runout fillet 52 and to each other by lower horizontal face 54 (not shown). Dovetail root 44 can be formed by molding or by partial molding and partial machining. For example, after molding the general shape of root 44, it can be machined to further refine the shape.

In operation of engine, blade 32 is spun by disc 34. High inter-laminar tension stresses are produced in dovetail root 44 and specifically in fillets 52 during operation of the engine and in a severe bending load, such as an impact loading by a bird or another blade striking the airfoil. These stresses are affected by the angles which pressure faces extend from horizontal. A larger pressure face angle results in less inter-laminar tension stresses in fillets 52. These stresses are resisted by pressure faces 50, which hold blade in disc 34 during operation and have a maximum bearing stress. The maximum bearing stress of pressure faces 50 is related to the total surface area of each pressure face 50 and the characteristics of materials which make blade 32.

In a composite blade made of a two-dimensional laminate, the high inter-laminar tension stresses produced in dovetail runout fillets 52 can result in delamination of the blade and can cause catastrophic failure and loss of blade 32. A composite blade made of a two-dimensional laminate generally has less laminate strength and a lower bearing stress allowable than traditional metal blades of the prior art. Therefore, for a composite blade to achieve maximum bearing stress levels similar to maximum bearing stress levels of a prior art metal blade of a similar size, larger pressure faces 50 (with more surface area) can be used in dovetail root 44. Larger pressure faces 50 can be formed by increasing the angle of pressure faces 50 with respect to horizontal, allowing pressure faces 50 to have more surface area while not interfering with the other slots in disc 34 (see FIG. 2). In prior art metal blades, the pressure faces 50 typically angle out at 45 degrees from horizontal. Therefore, increasing pressure face angles from the traditional 45 degrees from horizontal can allow a laminate composite blade to resist the high inter-laminar tension stresses in fillets with pressure faces 50 that have maximum bearing stress levels similar to the maximum bearing stress levels in prior art metal blades. Increasing pressure face angles also reduces inter-laminar stresses in fillets 52.

As pressure face angles increase, inter-laminar stresses in fillets 52 are reduced and larger pressure faces 50 are able to be accommodated to maintain maximum bearing stress, resulting in a stronger dovetail root 44 and therefore stronger composite blade 32. However, as the angle of pressure faces 50 increases with respect to the horizontal and as larger pressure faces 50 are used to maintain maximum bearing stress, dovetail root 44 (and corresponding slot 56) needs to go deeper into disc 34. The depth of dovetail root 44 is limited by the size of disc 34 which contains slot 56 holding dovetail root 44. Increasing the depth of dovetail root 44 beyond a certain amount can drive increased disc 34 diameters which would limit hub/tip ratios of an engine. The hub/tip ratio of an engine is the ratio of the outer diameter of the flowpath to the inner diameter of the engine, measured approximately at the inlet to the engine. A larger outer diameter and small inner diameter results in more potential flow area for the engine. The outer diameter is typically limited by the airframe (i.e. wing height), as an engine that is too large would drag on the ground. The inner diameter is limited by the hub (disc). The hub must be sufficiently large to be able to hold the dovetail slot and retain the blades while spinning. If the depth of dovetail root 44 is increased to a point where a larger disc (hub) is necessary to hold dovetail root 44, this would likely decrease the potential flow area of the engine. An angle for pressure faces 50 in the range of about 65 degrees to about 75 degrees (inclusive) from horizontal allows for pressure faces 50 of composite blade 32 to have sufficient surface area to maintain maximum bearing stress while staying shallow enough to maintain ideal hub/tip ratios and reduces inter-laminar stresses in fillet 52. This angle range can provide a strong dovetail root 44 to help composite blade 32 resist failures due to stresses in operation and under impact loading.

Figures 4A, 4B, 4C:
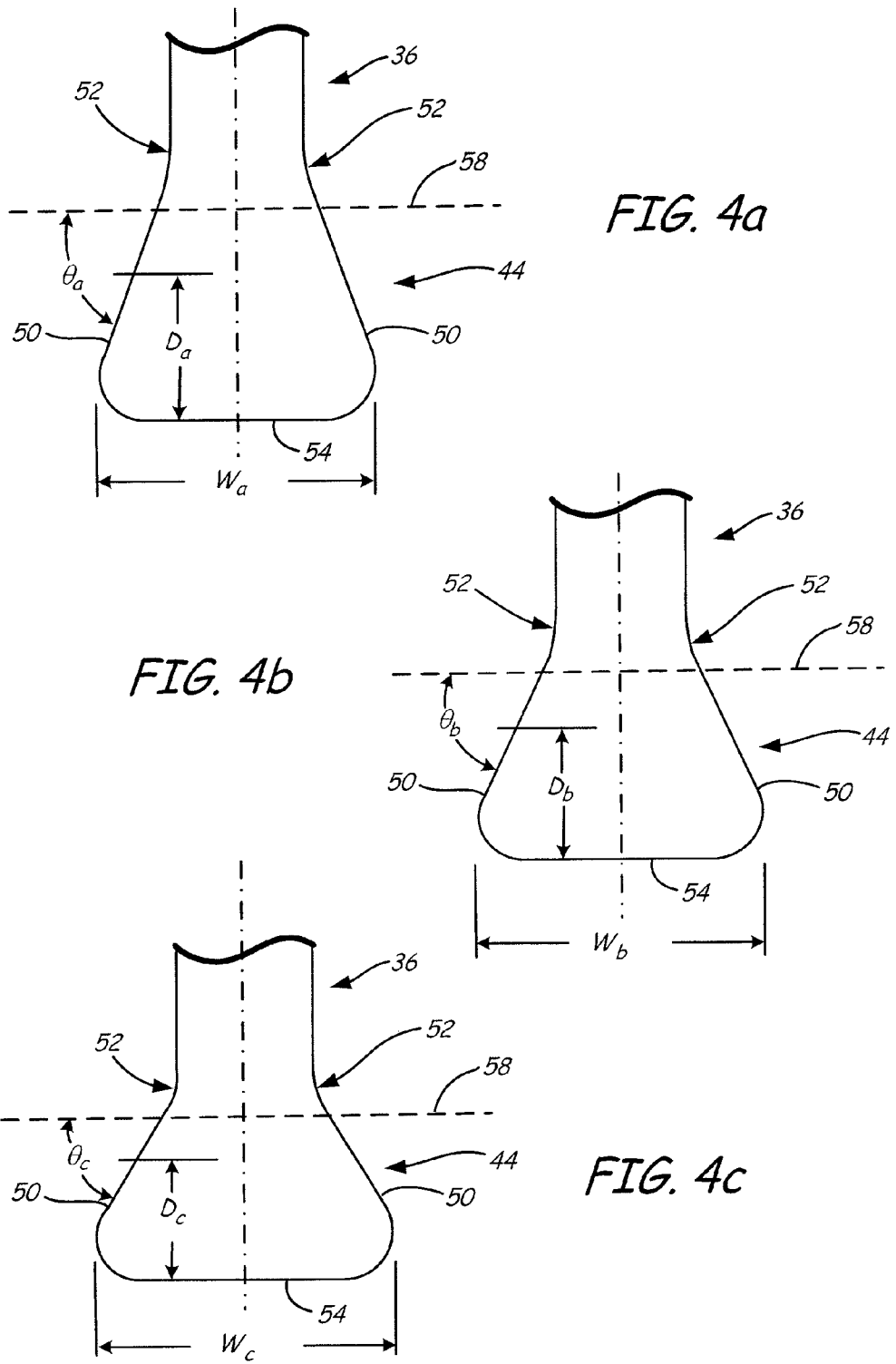
FIG. 4a is an enlarged cross-sectional view of the dovetail root of the composite blade with a pressure face angle of 70 degrees from horizontal.
FIG. 4b is an enlarged cross-sectional view of the dovetail root of the composite blade with a pressure face angle of 65 degrees from horizontal.
FIG. 4c is an enlarged cross-sectional view of the dovetail root of the composite blade with a pressure face angle of 58 degrees from horizontal.

FIGS. 4a-4c show cross-sections of dovetail root 44 with different angles θ for pressure faces 50, and with different dimensions required at the different pressure face angles θ to maintain maximum bearing stress. As mentioned above, a larger pressure face angle θ results in a reduction in inter-laminar stresses in fillets 52, and maximum bearing stress is a product of the surface area of pressure faces 50. In the examples in FIGS. 4a and 4b, a pressure face angle is a particular angle in the range of 65 degrees to 75 degrees from horizontal.

FIG. 4a illustrates dovetail root 44a with an angle $\theta_a$ of about 70 degrees from horizontal, a width $W_a$ of about 3.533 inches (89.7382 mm), and a depth $D_a$ (from a gage point) of about 1.869 inches (47.4726 mm). FIG. 4b illustrates dovetail root 44 with angle $\theta_b$ of about 65 degrees from horizontal, a width $W_b$ of about 3.658 inches (92.9132 mm), and a depth $D_b$ (from a gage point) of about 1.675 inches (42.545 mm), and FIG. 4c illustrates dovetail root with an angle $\theta_c$ of about 58 degrees from horizontal, a width $W_c$ of about 3.775 inches (95.885 mm), and a depth $D_c$ (from a gage point) of about 1.483 inches (37.6682 mm). Each cross-section of dovetail root 44 includes airfoil 36 pressure faces 50, dovetail runout fillets 52 and lower horizontal face 54. Dashed horizontal line 58 is shown for purposes of measuring pressure face 50 angles from horizontal. Dovetail runout fillets 52 connect pressure faces 50 to airfoil 36. Lower horizontal face 54 connects pressure faces 50. Depths $D_a$, $D_b$, and $D_c$ show the dovetail depth required at respective pressure face angles $\theta_a$, $\theta_b$, $\theta_c$ to maintain maximum bearing stress for blade 32 in disc 34 (not shown).

As can be seen from FIGS. 4a-4c and discussed in relation to FIG. 3, a larger angle θ for pressure faces 50, requires a deeper dovetail root 44 to maintain maximum bearing stress. A larger angle θ for pressure faces 50 also reduces inter-laminar tension stresses in fillet 52. FIG. 4a, with a pressure face angle $\theta_a$ of 70 degrees from horizontal, has the lowest inter-laminar tension stress levels in fillet 52 of the three dovetails shown in FIGS. 4a-4c, but requires the most depth $D_a$ at about 1.869 inches (47.4726 mm) and least width $W_a$, at about 3.533 inches (89.7382 mm) to maintain maximum bearing stress. FIG. 4b, with a pressure face angle $\theta_b$ of 65 degrees from horizontal, has higher inter-laminar tension stress levels in fillet 52 than FIG. 4a, and requires less depth $D_b$ and width $W_b$ than FIG. 4a at about 1.675 inches (42.545 mm) and about 3.658 inches (92.9132 mm), respectively, to maintain maximum bearing stress. FIG. 4c, with a pressure face angle $\theta_c$ of about 58 degrees from horizontal, has the highest inter-laminar tension stress levels of the three dovetail roots 44 shown in FIGS. 4a-4c, and also requires the least depth $D_c$ at about 1.483 inches (37.6682 mm) but the most width $W_c$ at about 3.775 inches (95.885 mm) to maintain maximum bearing stress. A pressure face angle in the range of about 65 degrees to about 75 degrees optimizes performance of composite fan blade 32, and particularly dovetail root 44, by decreasing inter-laminar tension stresses in fillets 52, allowing for pressure faces 50 to maintain ideal maximum bearing stresses, and keeping dovetail root 44 shallow enough to maintain ideal hub/tip ratios.

Figure 5:
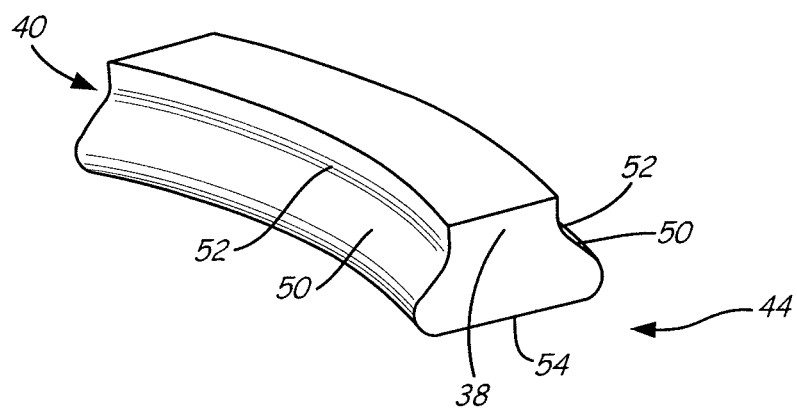
FIG. 5 is an enlarged perspective view of a curved dovetail root portion of a curved composite blade.

FIG. 5 is an enlarged perspective view of an embodiment of the current invention, wherein the dovetail root 44 (and the composite airfoil, not shown) is curved from leading edge 38 to trailing edge 40. Dovetail root 44 further includes angled pressure faces 50, dovetail runout fillets 52 and lower horizontal face 54. Dovetail pressure faces 50 are each angled outward at about 65 degrees to about 75 degrees from horizontal, with a dovetail runout fillet 52 connecting each pressure face 50 to the composite airfoil, and lower horizontal face 54 connecting the pressure faces 50 to each other.

In some composite fan blades, the airfoil is curved from leading edge 38 to trailing edge 40. This curvature adds to the aerodynamic efficiency of the blade in operation. When the airfoil is curved from leading edge 38 to trailing edge 40, the dovetail can also be curved in the same manner. Extending this curvature to dovetail root 44 avoids needing transitional sections (from the curved airfoil to a straight dovetail root) which would be difficult to design and shape in the manufacture of the blade. Curving the dovetail root 44 also allows for inclusion of the pressure face 50 angles of about 65 degrees to about 75 degrees from horizontal throughout the curved dovetail root. The slots in the hub holding each fanblade of this embodiment would be correspondingly curved to allow for this curved dovetail root 44 to slide in.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A composite fan blade having an airfoil with a leading edge and a trailing edge and a dovetail root, wherein the dovetail root comprises:
    a first pressure face and a second pressure face each angled outward at about 65 degrees to about 75 degrees from horizontal;
    a lower horizontal face connecting the pressure faces at the bottom of the dovetail; and
    a first and a second dovetail runout fillet connecting the first and the second pressure faces, respectively to the airfoil, wherein the dovetail is shaped to fit into a slot in a disc or a rotor and the angle of the pressure face is a particular angle within the range of about 65 degrees to about 75 degrees from the horizontal based on the size of the disc or the rotor.

2. The composite fan blade of claim 1, wherein the composite blade comprises a two-dimensional laminate composite.

3. The composite fan blade of claim 1, wherein the composite blade comprises woven core with a two-dimensional laminate composite surrounding the core.

4. The composite fan blade of claim 1, wherein the angle of the pressure face is a particular angle within the range of about 65 degrees to about 75 degrees from the horizontal based on a certain required number composite fan blades which must fit in the disc or rotor.

5. The composite fan blade of claim 1, wherein the angle of the pressure face is a particular angle within the range of about 65 degrees to about 75 degrees from the horizontal based on the characteristics of the composite materials used in the blade.

6. The composite fan blade of claim 1, wherein the airfoil and dovetail root are curved from leading edge to trailing edge.

7. A composite fan blade comprising:
    an airfoil with a leading edge and a trailing edge in a chordwise direction, a root and a tip in a spanwise direction; and
    a dovetail root, comprising:
        a first pressure face and a second pressure face each angled outward at an angle between about 65 degrees to about 75 degrees from horizontal and running from the leading edge to the trailing edge in the chordwise direction;
        a lower horizontal face connecting the pressure faces at the bottom of the dovetail; and
        a first and a second dovetail runout fillet connecting the first and second pressure faces, respectively, to the airfoil, wherein the angle of the pressure face is a particular angle within the range of about 65 degrees to about 75 degrees from the horizontal based on the size of the disc or the rotor.

8. The composite fan blade of claim 7, wherein the dovetail is shaped to fit into a slot in a disc or a rotor.

9. The composite fan blade of claim 8, wherein the dovetail holds the blade in the disc or rotor while it is spinning.

10. The composite fan blade of claim 9, wherein the pressure faces of the dovetail root press against the slot to hold the blade in the disc or rotor while it is spinning.

11. The composite fan blade of claim 7, wherein the composite fan blade comprises a two-dimensional laminate composite or a woven core with a two-dimensional laminate composite surrounding the core.

12. The composite fan blade of claim 7, wherein the airfoil and the dovetail are curved from leading edge to trailing edge.

13. A disc and composite fan blade assembly, the assembly comprising:
    a plurality of composite fan blades, each having an airfoil with a leading edge and a trailing edge in a chordwise direction, a root and a tip in a spanwise direction; and a dovetail root having a first pressure face and a second pressure face each angled outward at an angle between about 65 degrees to about 75 degrees from horizontal and running from the leading edge to the trailing edge in the chordwise direction, a lower horizontal face connecting the pressure faces at the bottom of the dovetail, and a first and a second dovetail runout fillet connecting the first and second pressure faces, respectively, to the airfoil; and
    a disc with a plurality of slots, each slot for holding the dovetail root of one of the plurality of composite fan blades, wherein the angle of each of the first and the second pressure faces is a particular angle within the range of about 65 degrees to about 75 degrees from the horizontal based on the size of the disc.

14. The disc and composite fan blade assembly of claim 13, wherein each composite fan blade is curved in the airfoil and the dovetail root from leading edge to the trailing edge.

15. The disc and composite fan blade assembly of claim 14, wherein each disc slot is curved to hold the curved dovetail roots.

16. The disc and composite fan blade assembly of claim 13, wherein the pressure faces of each dovetail root press against the slot which holds the dovetail root to hold each blade in the disc while the disc is spinning.

17. The disc and composite fan blade assembly of claim 13, wherein each slot in the disc holds one of the plurality of composite fan blade dovetail roots.

* * * * *